(12) United States Patent
Horst et al.

(10) Patent No.: US 10,563,458 B2
(45) Date of Patent: Feb. 18, 2020

(54) MECHANICAL DISCONNECT FOR ROTATION DRIVE

(71) Applicant: American Augers, Inc., West Salem, OH (US)

(72) Inventors: David Horst, Ashland, OH (US); B J Burky, Burbank, OH (US); Tim Casey, Wooster, OH (US)

(73) Assignee: American Augers, Inc., West Salem, OH (US)

( * ) Notice: Subject to any disclaimer, the term of this patent is extended or adjusted under 35 U.S.C. 154(b) by 131 days.

(21) Appl. No.: 15/853,156

(22) Filed: Dec. 22, 2017

(65) Prior Publication Data

US 2018/0179822 A1 Jun. 28, 2018

Related U.S. Application Data

(60) Provisional application No. 62/438,134, filed on Dec. 22, 2016.

(51) Int. Cl.
| | |
|---|---|
| *E21B 3/04* | (2006.01) |
| *E21B 7/04* | (2006.01) |
| *E21B 7/28* | (2006.01) |
| *E21B 3/02* | (2006.01) |
| *E21B 7/02* | (2006.01) |
| *F16D 11/00* | (2006.01) |

(52) U.S. Cl.
CPC .................. *E21B 3/04* (2013.01); *E21B 3/02* (2013.01); *E21B 7/046* (2013.01); *E21B 7/28* (2013.01); *E21B 3/045* (2013.01); *E21B 7/02* (2013.01); *F16D 11/00* (2013.01)

(58) Field of Classification Search
CPC ............... E21B 19/16; E21B 3/02; E21B 7/02
See application file for complete search history.

(56) References Cited

U.S. PATENT DOCUMENTS

| | | | |
|---|---|---|---|
| 2,667,820 | A | 2/1954 | De Vlieg |
| 3,470,968 | A | 10/1969 | Melsheimer et al. |
| 4,078,452 | A | 3/1978 | Rosler |
| 7,134,513 | B1 | 11/2006 | Randall et al. |
| 7,628,226 | B2 | 12/2009 | Mitchell et al. |
| 2009/0095526 | A1* | 4/2009 | Lane ..................... E21B 19/083 175/24 |

(Continued)

FOREIGN PATENT DOCUMENTS

GB 727603 A 4/1955

*Primary Examiner* — Giovanna C Wright
*Assistant Examiner* — Dany E Akakpo
(74) *Attorney, Agent, or Firm* — Tomlinson McKinstry, P.C.

(57) ABSTRACT

A horizontal directional drilling system. The system has a pilot drill and an exit side drill, with a drill string extending between them. A backreamer is positioned between the drills to enlarge a borehole. The pilot drill pulls and rotates the backreamer. The exit side drill adds segments to the product pipe and pushes the product pipe into the enlarged borehole. The exit side drill is equipped with a rotational disconnect. The disconnect is engaged to allow torque transfer between a motor and a spindle when adding segments to the product pipe. The disconnect is disengaged to prevent torque transfer between the motor and the spindle when pushing the product pipe into the enlarged borehole.

13 Claims, 7 Drawing Sheets

(56) References Cited

U.S. PATENT DOCUMENTS

| | | |
|---|---|---|
| 2013/0186662 A1* | 7/2013 | Argent .................. E21B 4/006 173/47 |
| 2014/0050522 A1 | 2/2014 | Slaughter, Jr. et al. |
| 2016/0069136 A1 | 3/2016 | Metcalf et al. |
| 2018/0163475 A1* | 6/2018 | Barbera ................. E21B 7/046 |

* cited by examiner

MECHANICAL DISCONNECT FOR ROTATION DRIVE

CROSS REFERENCE TO RELATED APPLICATION

This application claims the benefit of U.S. Provisional Application Ser. No. 62/438,134, file Dec. 22, 2016, the entire contents of which are incorporated herein by reference.

FIELD

The present invention relates generally to horizontal directional drilling systems.

SUMMARY

The present invention is directed to a horizontal directional drill. The horizontal directional drill comprises a rotationally-driven spindle, a rotary motor, and a rotational disconnect. The spindle is coupled to a drill string. The motor has an output shaft. The disconnect is configured to transfer torque between the output shaft and the spindle when engaged. The disconnect is further configured to prevent the transfer of torque between the output shaft and the spindle when disengaged.

In another embodiment the invention is directed to a method of installing an underground pipe. The method comprises rotating and advancing a pilot drill string to an exit point using a pilot horizontal directional drill. Thereafter, a backreamer is attached to the pilot drill string and a first product pipe section is attached to the backreamer using a motor-driven spindle supported by an exit side horizontal directional drill. Thereafter, the motor is decoupled from the spindle of the exit side horizontal directional drill. Next, the backreamer is pulled and rotated using the pilot horizontal directional drill while, simultaneously, the first product pipe section is pushed into the ground with the spindle of the exit side horizontal directional drill.

In another embodiment the invention is directed to a drilling system. The drilling system comprises a pilot drill, a pilot drill string, a drilling tool, a product pipe, and an exit side drill. The pilot drill string has a first end and a second end. The first end is operatively connected to the pilot drill. The drilling tool is attached to the pilot drill string at its second end. The product pipe is attached to the drilling tool. The exit side drill comprises a spindle, a motor, and a rotational disconnect. The spindle is operatively connected to the product pipe. The motor is configured to rotationally drive a shaft. The rotational disconnect is configured to transfer torque between the output shaft and the spindle when engaged. It is further configured to prevent the transfer of torque between the output shaft and the spindle when disengaged.

DETAILED DESCRIPTION

Figure 1:
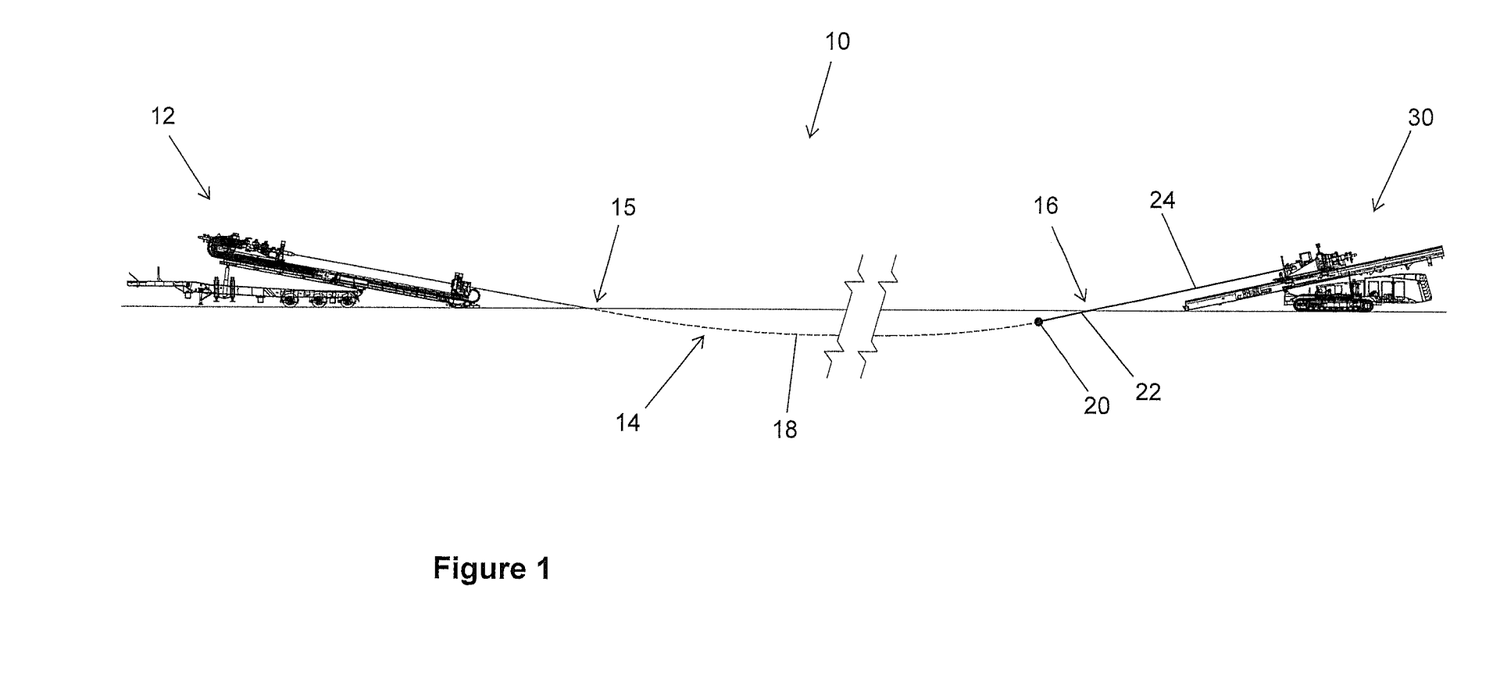
FIG. 1 is a diagrammatic representation of a drilling system.

Turning now to FIG. 1, a drilling system 10 with two drills is shown. The drilling system 10 is configured to install an operational "product pipe" underground, which may be a water, sewer, gas, or other conduit. The drilling system comprises a first drill, or pilot drill 12. The pilot drill 12 provides thrust and rotation to a pilot drill string 14 to advance a distal end of the pilot drill string from an entry point 15 to an exit point 16. The operation creates a "pilot bore" 18 underground extending from the pilot drill 12 to the exit point 16.

In many drilling operations, the pilot bore 18 does not have a sufficient diameter for a product pipe. In these operations, a backreamer 20 may be attached to the distal end of the pilot drill string 14 at the exit point 16. The pilot drill 12 then retracts and rotates the pilot drill string 14. The backreamer 20 enlarges the pilot bore 18 to form an enlarged bore 22. The backreamer 20 may be attached to segments of product pipe 24. Thus, as the backreamer 20 is pulled back toward the pilot drill 12, the product pipe 24 is installed.

In large installation operations, a force required to enlarge the pilot bore 18 and pull the product pipe 24 may be significant. Further, the product pipe 24 is preferably attached in segments having complimentary threaded ends. A second, or exit side drill 30 located at the exit point 16 provides torque to connect new segments to the installed product pipe 24. The second drill 30 additionally provides thrust force to the product pipe 24 and therefore the backreamer 20. This force assists the pilot drill 12 in enlarging the pilot bore 18.

Figure 2:
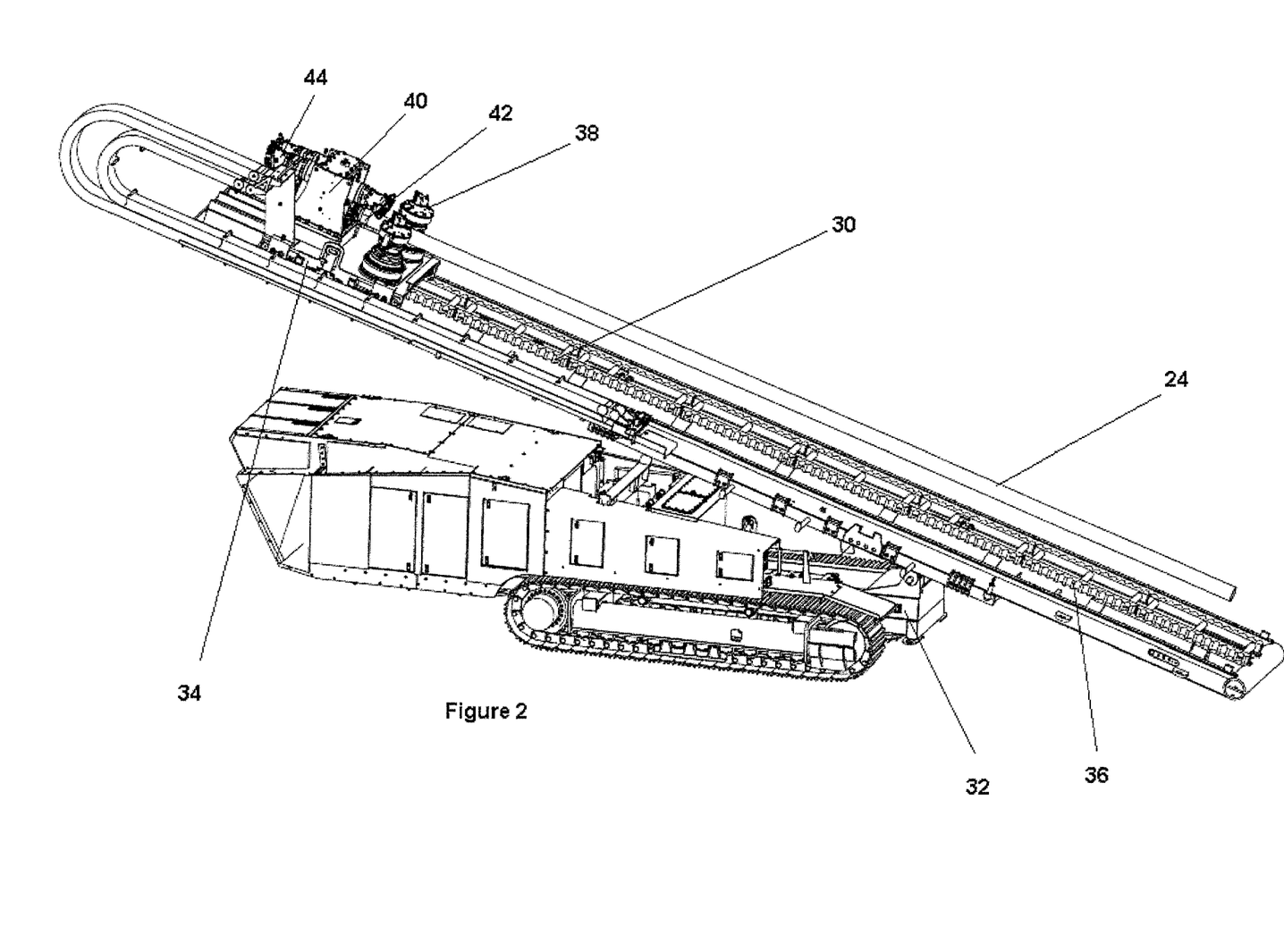
FIG. 2 is a side view of an exit side drill for use with the drilling system.

With reference to FIG. 2, the second drill 30 is shown. The second drill 30 comprises a frame 32 and a carriage 34 movable along the frame. The carriage 34 may be moved relative to a length of the frame 32 to provide thrust to the product pipe 24. The carriage 34 may be supported on and translated along a rack 36 and pinion system or other structure for moving along a linear path. As shown, pinion motors 38 turn pinions (not shown) to move the carriage 34 along the frame 32.

The carriage 34 supports a spindle assembly 40. The spindle assembly 40 comprises a spindle 42 for connecting to and providing rotational force to the product pipe 24. The spindle assembly 40 further comprises a rotary motor 44 for rotating the spindle 42.

Figure 3:
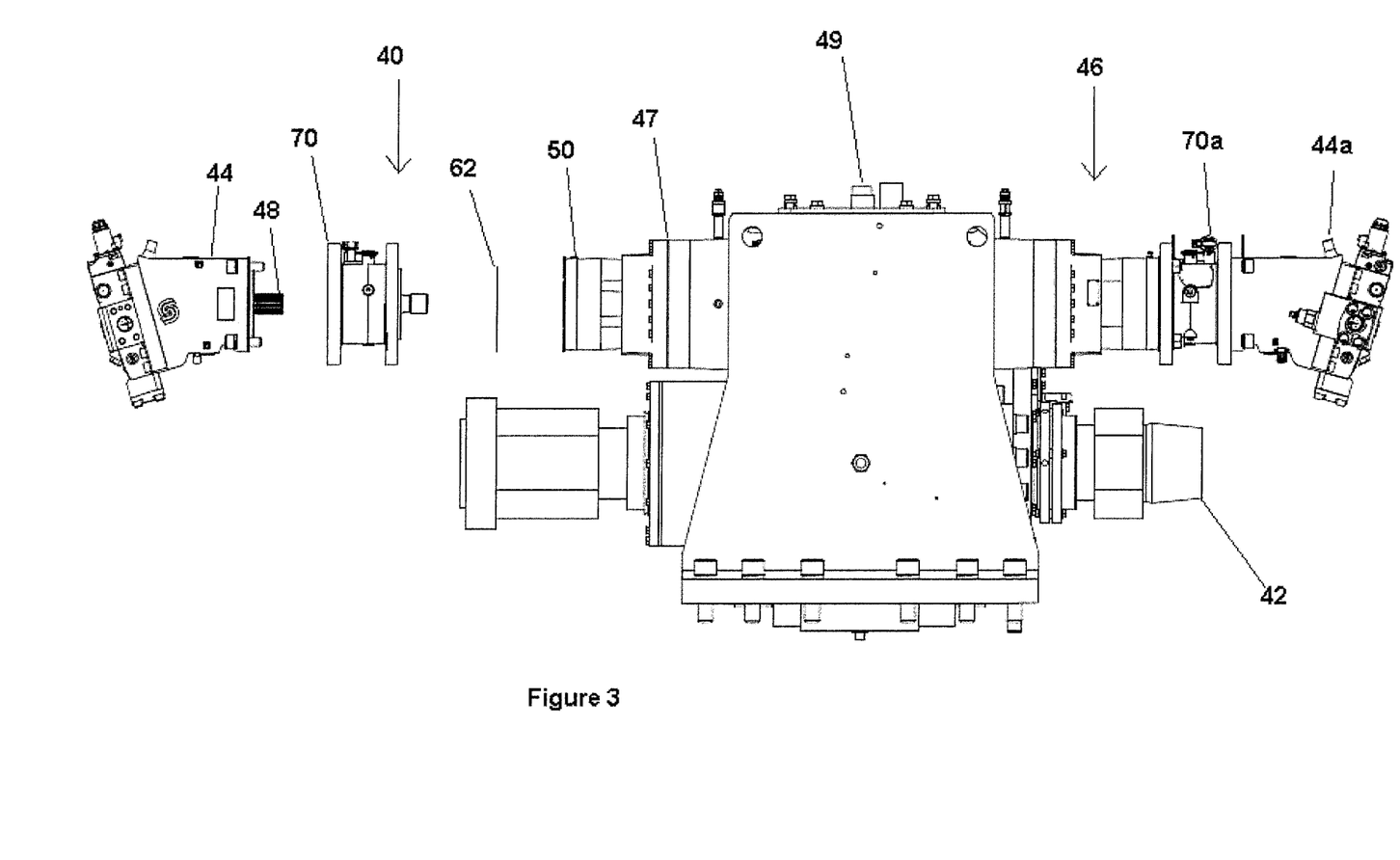
FIG. 3 is an exploded side view of a spindle assembly.
Figure 4:
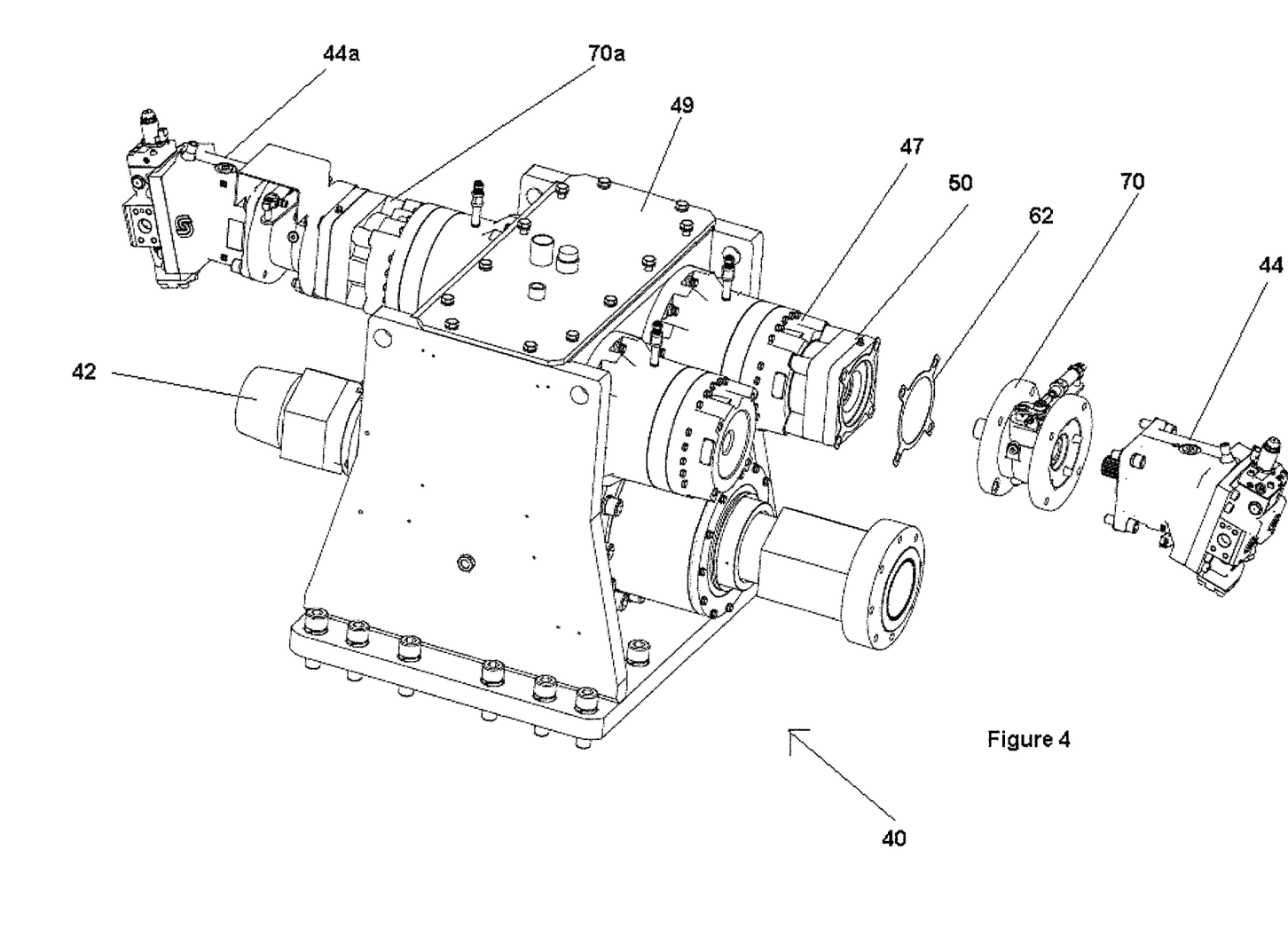
FIG. 4 is an exploded perspective view of the spindle assembly of FIG. 3.

With reference to FIGS. 3 and 4, the spindle assembly 40 further comprises a gear assembly 46. Rotational output generated by the motor 44 is generally in the rotation of a high speed motor output shaft 48. The gear assembly 46 may comprise a planetary gearbox 47 as well as a primary gearbox 49. Other gearing structures may be used. The gear assembly 46 converts high speed rotation imparted by the output shaft 48 into lower speed, higher torque rotational force at the spindle 42.

A rotary brake 50 is disposed between the motor 44 and the gearbox 47. The brake 50 receives a rotational input and directly transfers the rotational input to the gearbox 47 through a rotating shaft. The brake 50 may comprise a pair of opposed brake shoes (not shown) that selectively engage the rotating shaft. When engaged, the brake shoes impart a frictional resistance to the rotating shaft, slowing rotation of the shaft. Continued application of the brake 50 without operation of the motor 44 will stop rotation of the spindle 42. When not engaged, rotation of the spindle 42 is unimpaired by the brake 50.

A mechanical disconnect 70 is provided between the brake 50 and the motor 44. The disconnect 70 allows the spindle assembly 40 of the second drill 30 to operate in a "free spin" mode. Because the pilot drill string 14, backreamer 20, and product pipe 24 (FIG. 1) are rotationally locked, rotation imparted by the pilot drill 12 will rotate the spindle 42 of the second drill 30. The disconnect 70, when in the disengaged "free spin" mode, will keep such rotation from affecting the rotary motor 44 causing wear and damage to its components. A gasket 62 may be provided to seal the connection between the rotary brake 50 and disconnect 70.

A second disconnect 70a may be provided between a second motor 44a and the primary gearbox 49. Such a second disconnect 70a may be hydraulically linked to the disconnect 70 such that when one of the disconnects 70, 70a is in "free spin" mode, the other is as well. Further disconnects may be utilized if additional motors are likewise utilized.

Figure 5:
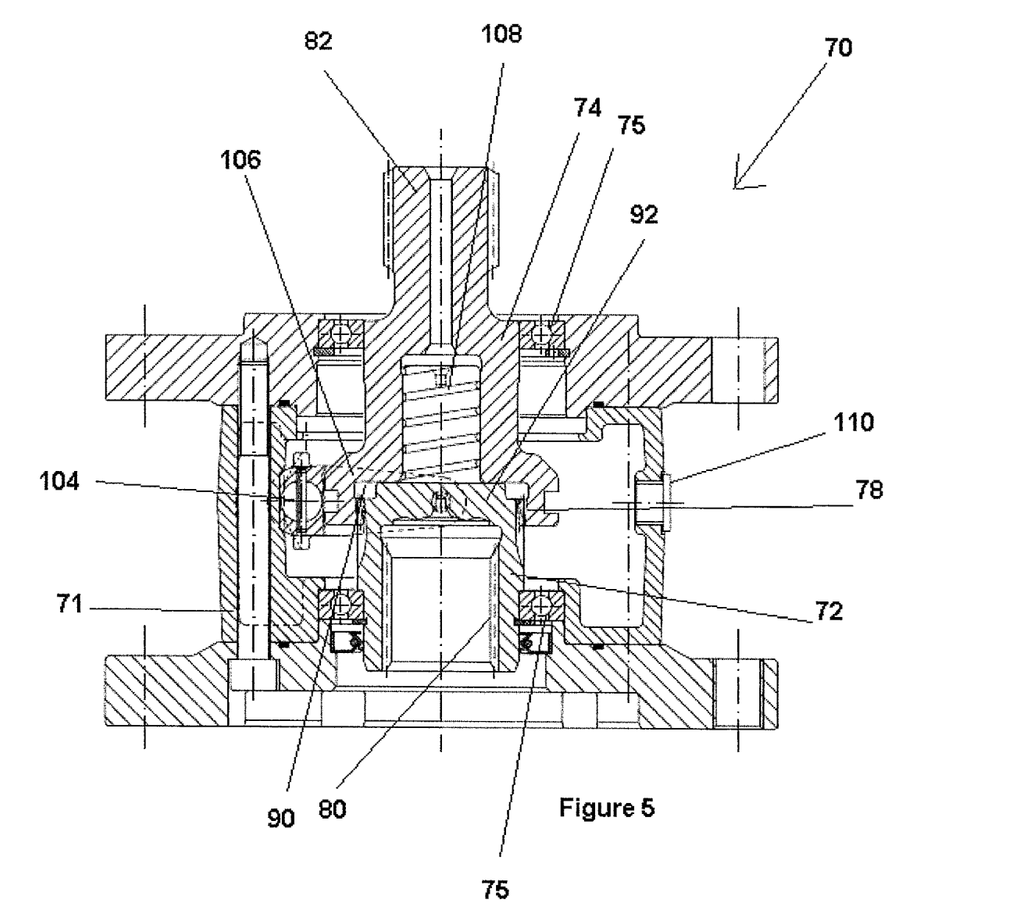
FIG. 5 is a sectional view of a disconnect in engaged position.
Figure 6:
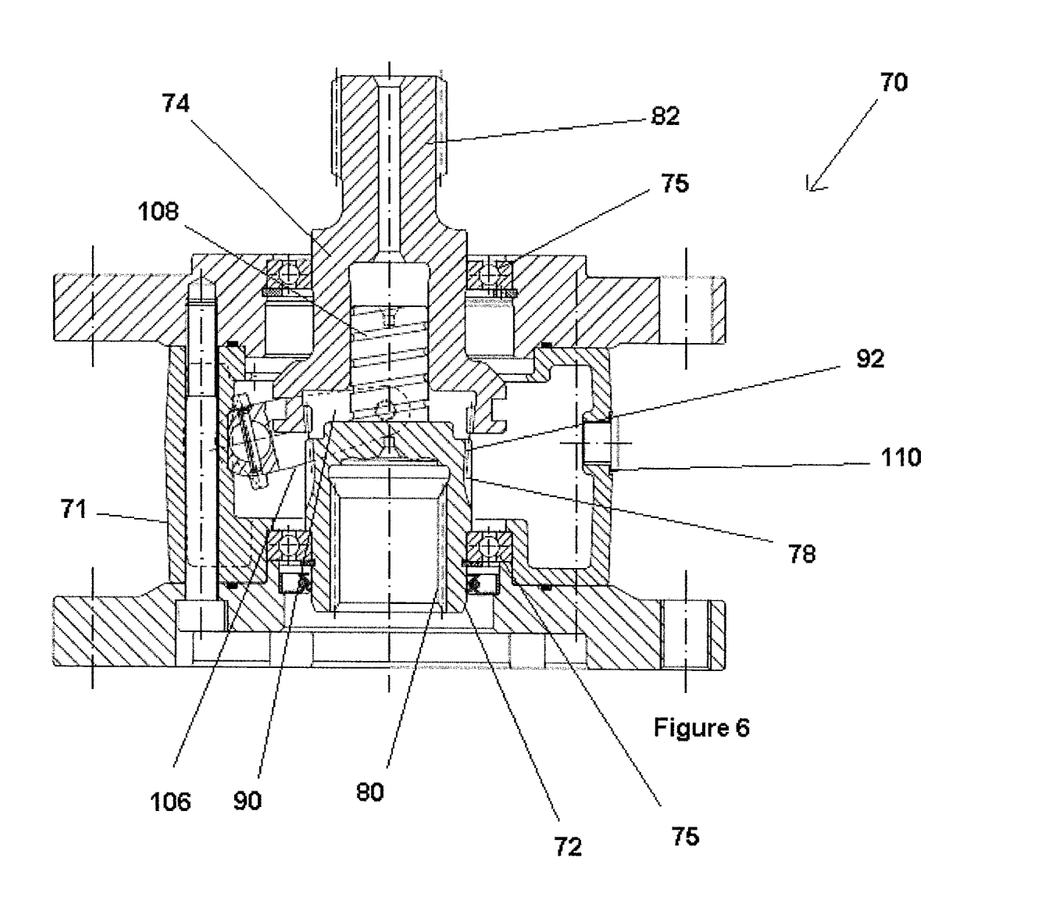
FIG. 6 is a sectional view of the disconnect of FIG. 5 in disengaged position.

With reference to FIGS. 5 and 6, the disconnect 70 is described in detail. The disconnect 70 comprises a frame 71, an input shaft 72, an output shaft 74, and a coupling 78. The input shaft 72 as shown has an input cavity 80 to receive rotational force from the output shaft 48 of the motor 44 (FIG. 3). The cavity 80 and output shaft 48 may comprise complementary shapes, such as splines or polygonal profiles. The input and output shafts 72, 74 may rotate relative to the frame 71. Bearings 75 provided between each of the shafts 72, 74 allow the transfer of torque. The frame 71 may be attached to stationary portions of the adjacent brake 50 and motor 44.

The output shaft 74 comprises a pinion 82 which is coupled through the brake 50 to the gearbox 47 (FIGS. 3-4). The pinion 82 may have a shape that is complementary to a cavity formed in the brake 50, such as a splined or polygonal profile. The pinion 82 is shorter than a full length of the cavity of the brake 50 such that the pinion 82 may travel within the cavity while maintaining engagement with the brake.

The coupling 78 is located at an interface between the output shaft 74 and input shaft 72 of the disconnect. As shown, the output shaft 74 has a cavity go with internally disposed splines. The input shaft 72 has a pinion 92 with complementary splines. Geometric interfaces may likewise be used. Further, the coupling 78 may be formed with a pinion on the output shaft 74. In this configuration, the input shaft 72 would have a cavity.

Figure 7:
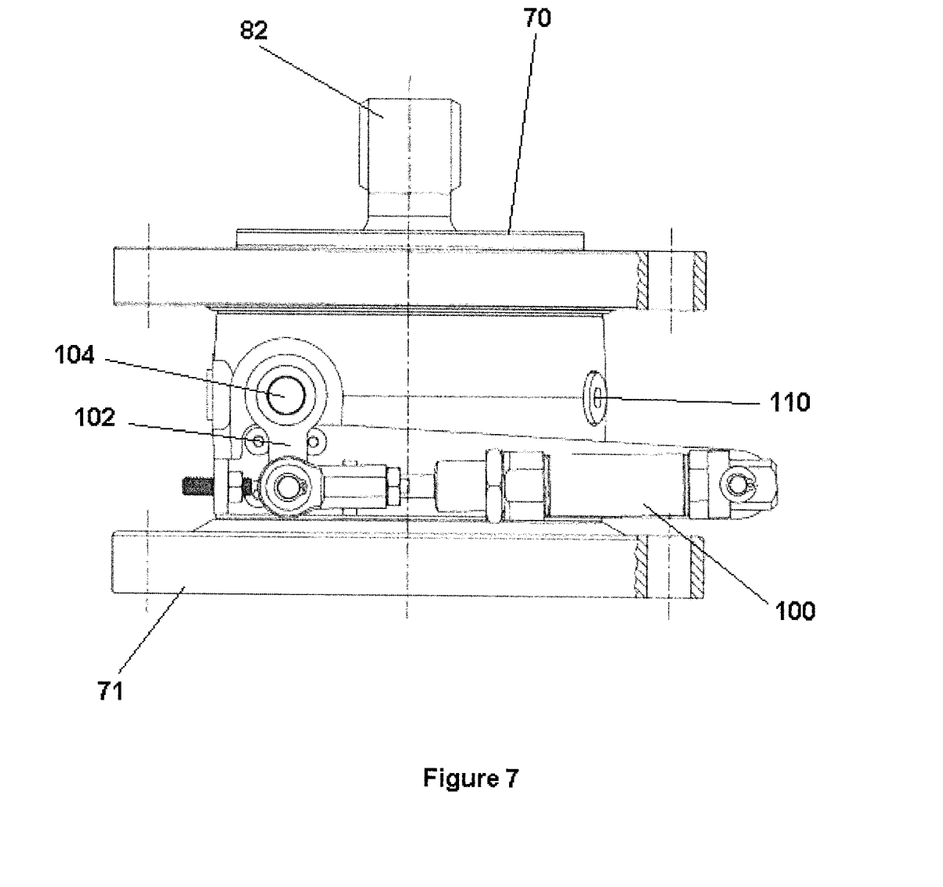
FIG. 7 is a side view of the disconnect of FIG. 5.

The coupling 78 has two modes: an engaged mode and a disengaged mode. As shown in FIG. 7, a hydraulic actuator 100 extends between the frame 71 and an external pivot arm 102. The external pivot arm 102 is connected at a pivot point 104 to an internal pivot arm 106. The internal pivot arm 106, as shown in FIGS. 5-6, is attached to the output shaft 74. Movement of the internal pivot arm 106 moves the output shaft 74 such that the splines on the output shaft 72 cavity 90 are engaged or disengaged with the pinion 92 of the input shaft 72 at the coupling 78.

A spring 108 disposed between the pinion 92 and the cavity go cushions the engagement between the input shaft 72 and output shaft 74.

When the coupling 78 is in engaged mode, rotation of the output shaft 48 of motor 44 is carried through the disconnect 70. This enables the spindle 42 to make up and break out sections of product pipe 24.

When the second drill 30 assists in pushing the product pipe 24, rotation is driven by the pilot drill 12. Thus, the coupling 78 is placed into disengaged mode. Any rotation of the product pipe 24 and spindle 42 is imparted to the output shaft 74 of the disconnect 70. However, as the coupling 78 is disengaged, the output shaft 74 rotates freely within the frame 71.

The disconnect 70 comprises a vent no to prevent pressure buildup due to rotation of the shafts 72, 74 or the movement of the output shaft 74 within the frame 71.

The disconnect 70 may be activated or deactivated from an operator console located on the second drill 30. Alternatively, the disconnect 70 may be operated remotely, or at the pilot drill 12.

Changes may be made in the construction, operation and arrangement of the various parts, elements, steps and procedures described herein without departing from the spirit and scope of the invention as described in the following claims. For example, a control system may be used to actuate each coupling or decoupling event, or a mechanical lever may be used. A hydraulic actuator is described, but other suitable actuators may be used.

The invention claimed is:

1. A method of using a horizontal directional drilling system, the system comprising:
   an exit-side horizontal directional drill comprising:
      a rotationally-driven spindle coupled to a drill string;
      a rotary motor having an output shaft; and
      a rotational disconnect configured to transfer torque between the output shaft and the spindle when engaged, and to prevent the transfer of torque between the output shaft and the spindle when disengaged; and
   a pilot horizontal directional drill;
   in which the drill string is disposed between the horizontal directional drill and the pilot horizontal directional drill;
   the method comprising:
      pulling and rotating the drill string with the pilot drill; and
      simultaneously, pushing the drill string with the exit side drill while the output shaft and spindle are not rotationally coupled.

2. The method of claim 1 wherein the exit-side horizontal directional drill further comprises an arm configured to disengage the output shaft and the spindle.

3. The method of claim 1 wherein the exit-side horizontal directional drill further comprises a rotary brake disposed between the rotational disconnect and the spindle.

4. The method of claim 1 wherein the pilot horizontal directional drill comprises:
   a second rotationally-driven spindle coupled to the drill string;
   a second rotary motor having a second output shaft; and
   a second rotational disconnect configured to transfer torque between the second output shaft and the second spindle when engaged, and to prevent the transfer of torque between the second output shaft and the second spindle when disengaged.

5. The method of claim 1 wherein the system further comprises a backreamer positioned along the drill string between the horizontal directional drill and the pilot horizontal directional drill.

6. The method of claim 5 wherein the drill string between the backreamer and the horizontal directional drill defines a first diameter and the drill string between the backreamer and the pilot horizontal directional drill defines a second diameter, in which the second diameter and first diameter are unequal.

7. The method of claim 6 wherein the first diameter is greater than the second diameter.

8. A method of installing an underground pipe using a system comprising:
   a pilot horizontal directional drill;
   a pilot drill string having a first end and a second end, wherein the first end is operatively connected to the pilot horizontal directional drill;
   a backreamer attached to the pilot drill string at its second end;
   a first product pipe section; and
   an exit side horizontal directional drill comprising a motor-driven spindle;
   wherein the method comprises:
      rotating and advancing the pilot drill string to an exit point using the pilot horizontal directional drill;
      thereafter, attaching the backreamer to the pilot drill string;
      rotating the first product pipe section wherein such rotation attaches the first product pipe section to the backreamer using the motor-driven spindle supported by the exit side horizontal directional drill;
      thereafter, decoupling the motor from the spindle of the exit side horizontal directional drill;
      thereafter, pulling and rotating the backreamer using the pilot horizontal directional drill; and
      simultaneously with the step of pulling and rotating the backreamer, pushing the first product pipe section into the ground with the spindle of the exit side horizontal directional drill.

9. The method of claim 8 further comprising:
   after pushing the first product pipe section into the ground, coupling the motor to the spindle of the exit side horizontal directional drill;
   disconnecting the first product pipe section from the spindle;
   thereafter, connecting a second product pipe section to the spindle;
   rotating the second product pipe section with the spindle in order to connect the second product pipe section to the first product pipe section; and
   thereafter, decoupling the motor from the spindle of the exit side drill.

10. The method of claim 8 wherein the step of decoupling the motor from the spindle of the exit side horizontal directional drill comprises:
    disconnecting an input shaft from an output shaft in a mechanical disconnect disposed between the motor and the spindle.

11. A method of using a drilling system, the drilling system comprising:
    a pilot drill;
    a pilot drill string having a first end and a second end, wherein the first end is operatively connected to the pilot drill;
    a drilling tool attached to the pilot drill string at its second end;
    a product pipe attached to the drilling tool;
    an exit side drill comprising:
       a spindle operatively connected to the product pipe;
       a motor configured to rotationally drive a shaft; and
       a rotational disconnect configured to transfer torque between the output shaft and the spindle when engaged, and to prevent the transfer of torque between the shaft and the spindle when disengaged;
    wherein the method comprises:
       pulling and rotating the pilot drill string with the pilot drill;
       simultaneously, pushing the product pipe with the exit side drill while the spindle and shaft are not rotationally coupled.

12. The method of claim 11 further comprising:
    after pushing the product pipe with the exit side drill, ceasing rotation of the pilot drill string;
    thereafter, coupling the spindle to the shaft; and
    thereafter rotating the spindle to attach a product pipe segment to the product pipe.

13. The method of claim 11 wherein the pilot drill and exit side drill are positioned above ground and the drilling tool is located underground.

* * * * *

UNITED STATES PATENT AND TRADEMARK OFFICE
CERTIFICATE OF CORRECTION

PATENT NO. : 10,563,458 B2
APPLICATION NO. : 15/853156
DATED : February 18, 2020
INVENTOR(S) : Horst et al.

Page 1 of 1

It is certified that error appears in the above-identified patent and that said Letters Patent is hereby corrected as shown below:

In the Specification

Column 3, Line 45, please delete "go" and substitute therefore "90".
Column 3, Line 62, please delete "go" and substitute therefore "90".
Column 4, Line 8, please delete "no" and substitute therefore "110".

Signed and Sealed this
Twelfth Day of May, 2020

Andrei Iancu
*Director of the United States Patent and Trademark Office*